United States Patent
Davies et al.

(10) Patent No.: US 10,421,563 B2
(45) Date of Patent: Sep. 24, 2019

(54) DEPLOYMENT KIT

(71) Applicant: AMSAFE Bridport Limited, Bridport (GB)

(72) Inventors: Andrew Alexander Davies, Shropshire (GB); Keith Stephen Mulhern, Erie, PA (US); Ranasinghe Hewage Prasad Kularatna, Kandy (LK); Gamaralalage Manoj Buddhika, Pallewela (LK)

(*) Notice: Subject to any disclaimer, the term of this patent is extended or adjusted under 35 U.S.C. 154(b) by 0 days.

(21) Appl. No.: 14/501,186

(22) Filed: Sep. 30, 2014

(65) Prior Publication Data

US 2015/0013275 A1    Jan. 15, 2015

Related U.S. Application Data

(62) Division of application No. 13/564,385, filed on Aug. 1, 2012.

(30) Foreign Application Priority Data

Aug. 2, 2011  (GB) .................................... 1113256

(51) Int. Cl.
    *B65B 11/02*    (2006.01)
    *B64D 9/00*     (2006.01)
    *B60P 7/08*     (2006.01)
(52) U.S. Cl.
    CPC ............ *B65B 11/02* (2013.01); *B60P 7/0876* (2013.01); *B64D 9/00* (2013.01); *Y10T 29/49826* (2015.01)

(58) Field of Classification Search
    CPC .. A65B 11/02; B60P 7/0876; Y10T 29/79826; B64D 9/00
    See application file for complete search history.

(56) References Cited

U.S. PATENT DOCUMENTS

| | | |
|---|---|---|
| 2,455,237 A | 11/1948 | Davis |
| 2,646,097 A | 7/1953 | Gaverth et al. |
| 3,614,154 A | 10/1971 | Evans |
| 4,611,961 A | 9/1986 | Van Iperen et al. |
| 4,718,711 A * | 1/1988 | Rabbit .................... B60J 11/02 296/136.03 |
| 4,811,768 A * | 3/1989 | Williams ................ A45C 1/04 150/102 |
| 5,242,206 A | 9/1993 | Heck |
| 5,328,230 A | 7/1994 | Curchod |
| 5,364,155 A * | 11/1994 | Kuwahara ............... B60J 11/00 296/136.04 |
| 5,401,074 A | 3/1995 | Timerman |
| 5,409,286 A | 4/1995 | Huang |
| 5,506,020 A | 4/1996 | Haberkorn |

(Continued)

OTHER PUBLICATIONS

Google-car, Google, searched term "car on pallet" before Aug. 1, 2011, search date: Aug. 16, 2017.*

(Continued)

*Primary Examiner* — Tri M Mai
(74) *Attorney, Agent, or Firm* — Strategy IP, a PLC (57) ABSTRACT

A kit for covering a load (18) comprising: a cargo cover (10); a deployment means comprising a base sheet (2) for containing the cargo cover (10) prior to covering the load (18), the base sheet (2) comprising releasable securement means (4) for securing it around the cargo cover (10); and a plurality of cargo cover deployment straps (12, 14).

18 Claims, 6 Drawing Sheets

(56) References Cited

U.S. PATENT DOCUMENTS

| | | | |
|---|---|---|---|
| 5,795,009 | A | 8/1998 | Sack et al. |
| 5,993,062 | A | 11/1999 | Shackleton |
| 6,070,629 | A | 6/2000 | Whiteside |
| 6,092,857 | A * | 7/2000 | Rivas ........................ 296/136.04 |
| 6,863,482 | B2 | 3/2005 | Lockhart et al. |
| 6,968,801 | B2 * | 11/2005 | Baker ........................... 114/362 |
| 6,997,503 | B2 | 2/2006 | Fukagawa |
| 7,204,280 | B2 * | 4/2007 | Allen ........................... 150/166 |
| 7,290,826 | B2 * | 11/2007 | Dempsey ................ B60J 11/00 |
| | | | 150/166 |
| 7,337,793 | B2 * | 3/2008 | Chen ........................... 135/88.07 |
| 8,132,839 | B2 | 3/2012 | Penman |
| 2004/0035511 | A1 | 2/2004 | Rolph |
| 2005/0028910 | A1 | 2/2005 | Duty |
| 2005/0199661 | A1 | 9/2005 | Johnson |
| 2009/0236019 | A1 | 9/2009 | Maruzzo |
| 2010/0212789 | A1 | 8/2010 | De La Croix |
| 2011/0148138 | A1 | 6/2011 | Penman |

OTHER PUBLICATIONS

Google-Motorcycle, Google, searched term "pallet and motorcycle" before Aug. 1, 2011, search date: Aug. 16, 2017.*
Standard Pallet Sizes & Dimensions, search date Dec. 28, 2018, https://www.1001pallets.com/standard-pallet-sizes-and-dimensions/.

* cited by examiner

DEPLOYMENT KIT

FIELD OF THE INVENTION

The present invention relates to a kit for covering a load, a kit for deploying a cargo cover over a load, and to a method of covering a load, for example, for transportation of a palletised load by road, sea, or air.

BACKGROUND OF THE INVENTION

It is well-known to transport goods on pallets. A pallet net is generally used to secure the goods on to the pallet. Cargo covers are often used to provide additional protection to a load, such as fire containment, waterproofing, thermal insulation, environmental protection, explosion containment, or any other form of protection that is desired. Cargo covers may be secured to a pallet using a cargo net, or by any other suitable means, as is generally well-known in the industry.

A problem associated with existing cargo covers is that they can be quite heavy, especially when they are sized to cover large loads, such as those generally used for air transportation. This can make them difficult to deploy over loads, and may require additional manpower or machinery for the loading process.

It is an object of the present invention to overcome some of the disadvantages of the prior art, or at least to offer an alternative solution to the currently available products and methods.

SUMMARY OF THE INVENTION

According to a first aspect of the present invention there is provided a kit for covering a load comprising: a cargo cover; a deployment means comprising a base sheet for containing the cargo cover prior to covering the load, the base sheet comprising releasable securement means for securing it around the cargo cover; and a plurality of cargo cover deployment straps.

Cargo covers generally comprise a rectangular roof panel and four wing panels extending from the edges of the roof panel. The wing panels are generally attached to adjacent wing panels such that the cargo cover defines five sides of a cube or cuboid shape. A problem with currently available cargo covers is that they can be large, heavy and unwieldy, and it is difficult for cargo handlers to deploy the cargo cover over the load. The present invention facilitates easier deployment of a cargo cover by containing it within a deployment means. The cargo cover can be neatly stored with the deployment means and then the deployment means is positioned on top of the load. Depending on the size of the load the deployment means can be lifted by cargo handlers, or it can be lifted on top of the load using a fork lift truck. Once the deployment means has been correctly position the deployment straps can be pulled, causing the releasable securement means to break open and the cargo cover to be deployed.

In an embodiment of the invention the cargo cover deployment straps are connected to the cargo cover.

In an alternative embodiment of the invention the cargo cover deployment straps are provided with means for releasably connecting them to the cargo cover.

In an embodiment of the invention the base sheet comprises positioning straps for positioning the kit on the load. The positioning straps may be pulled by cargo handlers to position the kit on the load prior to the pulling of the deployment straps to deploy the cargo cover over the load.

The positioning straps may conveniently be attached to the underside of the base sheet. The positioning straps may conveniently be provided in pairs, such that each member of the pair can be pulled from an opposite side of the load to aid positioning.

In an embodiment of the invention the releasable securement means comprises hook and loop fastenings. In an embodiment of the invention the releasable securement means comprises press stud fastenings. In an embodiment of the invention the releasable securement means comprises quick release fastenings. In some embodiments of the invention the releasable securement means are configured such that they open when the deployment straps are pulled. In alternative embodiments of the invention at least some of the releasable securement means must be opened by a user prior to use. In yet further embodiments of the invention at least some of the releasable securement means may be lockable to prevent tampering or theft of the cargo cover during storage or transit.

In an embodiment of the invention the positioning straps and the cargo cover deployment straps are provided with identification means. In an embodiment of the invention the identification means comprises coloured identification means. In an embodiment of the invention the identification means comprises straps having different characteristics. In an embodiment of the invention the positioning straps are formed from a braided material and the deployment straps are formed from a webbing material. In an embodiment of the invention the deployment straps are formed from a braided material and the positioning straps are formed from a webbing material.

The identification means enables a user to distinguish between the deployment means and the positioning means, and can even be used to enable a user to distinguish between different ones of the deployment means or positioning means, for example, deployment means or positioning means intended to be located on one side of a load may be a different colour to deployment means or positioning means intended to be located on an opposite side of the load. The identification means can help to speed up loading time, which is important in cargo handling.

In an embodiment of the invention the base sheet comprises pockets for storage of the cargo cover deployment straps and/or the positioning straps. The deployment straps and/or the positioning straps can be stored in the pockets when not in use, which can help to prevent damage and also ensure that the straps do not become separated from the base sheet in situations where they are not permanently connected.

In an embodiment of the invention the base sheet is provided with carrying handles. The carrying handles may conveniently be made from loops of webbing material stitched to the base sheet, such that the kit can be carried, for example in the manner of a holdall bag, when not in use. The carrying handles may also function as lifting loops for lifting the kit into position.

According to a second aspect of the present invention there is provided a kit for deploying a cargo cover over a load comprising: a deployment means comprising a base sheet for containing the cargo cover prior to deployment, the base sheet comprising releasable securement means for securing it around the cargo cover; and a plurality of cargo cover deployment straps, the deployment straps being provided with means for connecting them to the cargo net.

Additional features of this aspect of the invention are generally the same as those described with reference to the deployment means and deployment straps of the first aspect of the invention.

According to a third aspect of the present invention there is provided a method of covering a load comprising the steps of: providing a cargo cover with deployment straps, the cargo cover being stored in a deployment means, the deployment means being releasably secured around the cargo cover; placing the cargo cover and deployment means on top of the load; and pulling the deployment straps to release the cargo cover from the deployment means.

In an embodiment of the invention the deployment straps are releasably connectable to the cargo cover, and the method comprises the further step of attaching the deployment straps to the cargo cover.

In an embodiment of the invention the method further comprises the step of continuing to pull the deployment straps to deploy the cargo cover over the load.

In an embodiment of the invention the method further comprises the steps of: providing positioning straps attached to the deployment means; and pulling the positioning straps to position the cargo cover on top of the load.

In an embodiment of the invention the method comprises the step of folding the cargo cover for storage in the deployment means prior to use.

The present invention will now be described, purely by way of example, with reference to the accompanying drawings, in which:

DETAILED DESCRIPTION OF THE INVENTION

Figure 1:
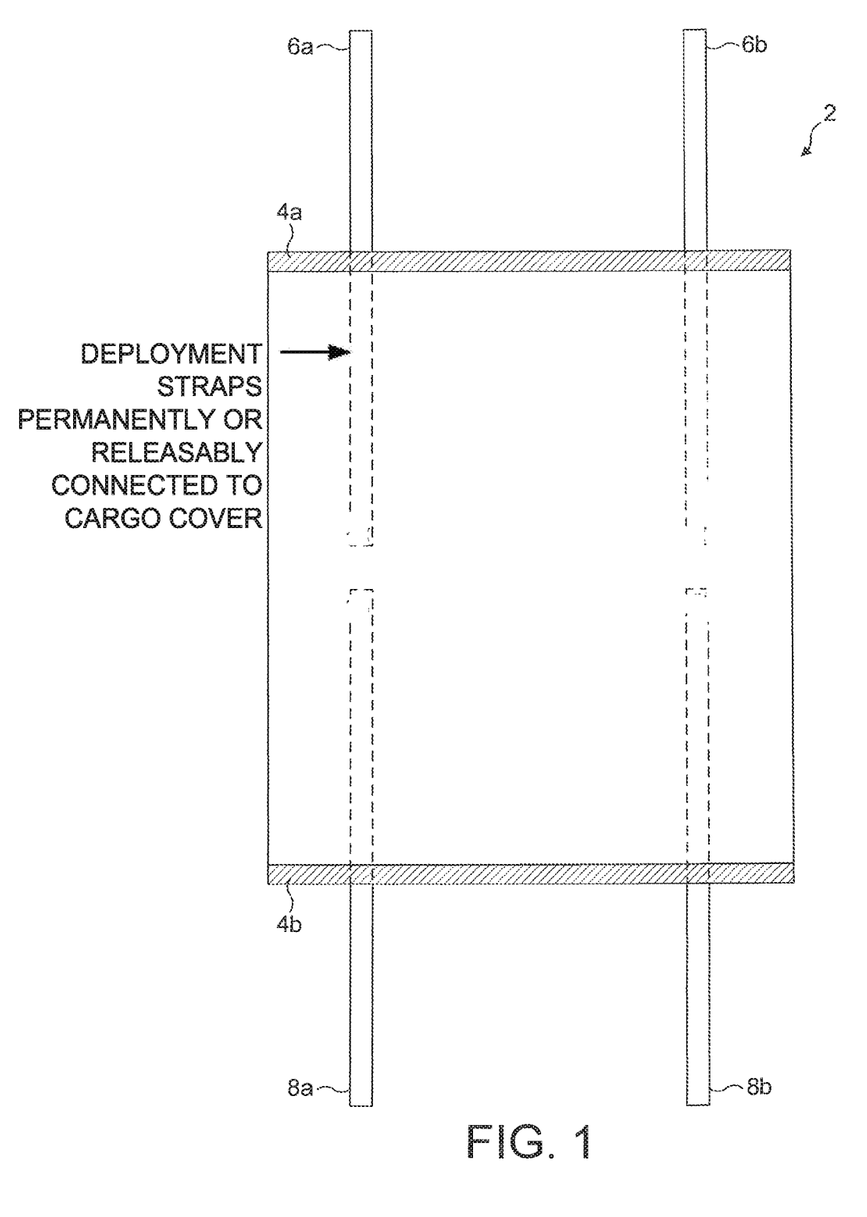
FIG. 1 shows a plan view base sheet of a deployment means.

Referring firstly to FIG. 1, this shows a plan view of a base sheet 2 of a deployment means. The base sheet 2 is made from a plastics material, such as polyethylene, which could be the same material as the material of a cargo cover it is intended to contain, or it could be a different material. The base sheet 2 can be single ply, double ply, or multi-ply, with insulation material provide between the layers if desired. Alternatively, the base sheet 2 can be formed from any suitable fabric material. The base sheet 2 will either be removed before transportation of the load, or it will sit under the cargo cover 10. It does not need to meet any particular fire safety requirements. However, it is preferred that the base sheet 2 is made from a fire resistant material, so as not to contribute to a cargo fire, or to provide additional fire protection to the roof of a fire containment cover. The base sheet 2 is preferably made from a light-weight, durable material which is strong enough to contain the cargo cover 10 in normal usage, but does not substantially increase the weight of a load.

The base sheet 2 is rectangular in shape, although other shapes are possible, as will be appreciated by the skilled person. The short sides of the base sheet 2 are each provided with one half of a releasable securement means 4. The releasable securement means comprises a hook and loop fastening, with a hook member 4a being provided along an edge of one short side and a corresponding loop member 4b being provided along an edge of the opposite short side. The hook and loop fastening 4a, 4b must be strong enough to secure the base sheet 2 around a cargo cover in normal use, but it must also be selected such that may be manually detached by a user, or users, when desired. In alternative embodiments of the invention additional securement means may be provided, e.g. quick release clips, which need to be manually undone prior to use. In yet further embodiments some of the securement means may be lockable to prevent theft or tampering during storage or transportation.

Positioning straps 6, 8 are attached to the underside of the base sheet 2. The positioning straps 6, 8 are formed from a webbing material of polyester or nylon, and are preferably made from a fire resistant material. The positioning straps 6,8 are permanently attached to the base sheet 2 by stitching 11, or any other suitable means. In an alternative embodiment of the present invention the positioning straps 6, 8 may be releasably connectable to the base sheet 2, for example using snap hooks and complementary fittings on the base sheet 2. The positioning straps 6, 8 are attached at attachment points, which are towards a centre line of the base sheet 2, midway between the two short sides. The positioning straps 6, 8 are coloured coded to aid identification and prevent cross over of the positioning straps 6, 8 during use. The positioning straps 6a, 8a on the left hand side of the base sheet 2 are differently coloured to the positioning straps 6b, 8b on the right hand side. This enables quick and easy identification of the positioning straps 6, 8 by cargo handlers—which is particularly important on large loads where the cargo handlers may not be able to see the base sheet 2 when it is on top of the load. The use of the positioning straps 6, 8 will be described in more detail in relation to FIGS. 2-6.

Figure 2:
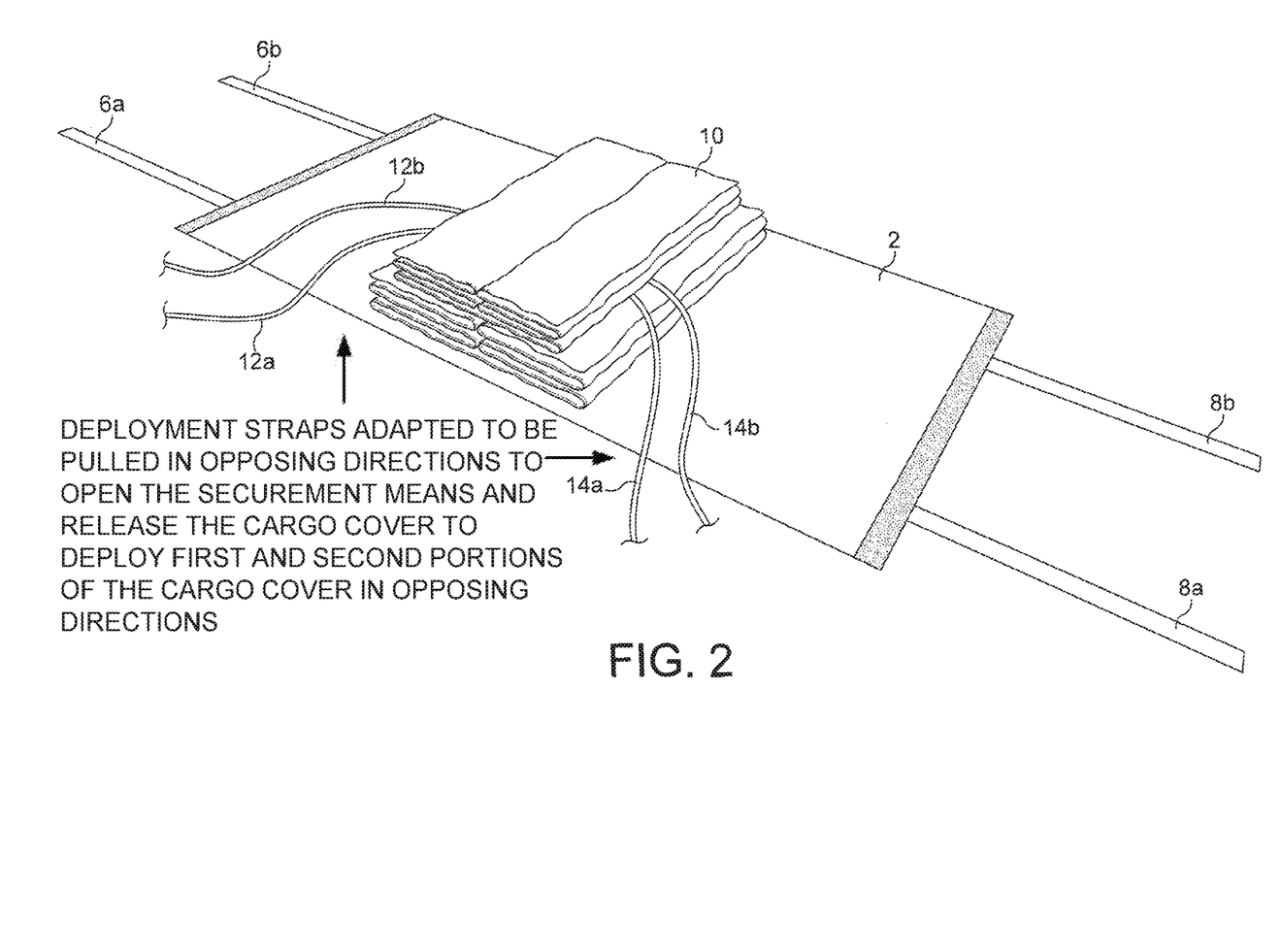
FIG. 2 shows a perspective view of a folded cargo cover on the base sheet of FIG. 1.

FIG. 2 shows a perspective view of a cargo cover 10 loaded on to the base sheet 2. The cargo cover 10 has been folded prior to loading on to the base sheet 2. The cargo cover 10 can be folded in a variety of ways, but it is preferably folded in such a way that it can be easily deployed over a load when required. If the cargo cover 10 has a cargo net attached then it is preferably folded in such a way that the cargo net does not protrude from the folded cargo cover 10. In order to fold the cargo cover 10 it is laid out as flat as possible and the bottom edges of the wing panels are folded inwards. Once the cargo cover 10 has been folded to a suitably small size, which depends on the size of the cargo cover 10, the size of the base sheet 2 and the size of the load, it is loaded on to the base sheet 2. The cargo cover 10 is made from a fire resistant material.

Cargo cover deployment straps 12, 14 are releasably attached to the cargo cover 10. The deployment straps 12, 14 are formed from a braided rope made from polyester or nylon which is attached to the cargo cover 10 by means of snap hooks (not shown). The cargo cover deployment straps 12, 14 are made from a fire resistant material. The snap hooks are attached to webbing loops at the bottom corners of the cargo cover 10. Alternatively, the deployment straps 12, 14 could be attached to any suitable existing feature on the cargo cover 10. Alternatively, in the case where the cargo cover 10 has an integral cargo net (as in the present case—see FIG. 6), the deployment straps 12, 14 may be attached to a bottom edge of the cargo net. In an alternative embodiment of the present invention the deployment straps 12, 14 may be permanently attached to the cargo cover 10 or cargo net.

The deployment straps 12, 14 are preferably attached to the cargo cover 10 prior to folding, and care must be taken to ensure that the deployment straps 12, 14 are kept free when the cargo cover 10 is folded. As with the positioning straps 6, 8, the deployment straps 12, 14 are coloured coded to aid identification and prevent cross over during use. The deployment straps 12a, 14a attached to the left hand side of the cargo cover are differently coloured to the deployment straps 12b, 14b on the right hand side. This enables quick and easy identification of the deployment straps 12, 14 by cargo handlers—which is particularly important on large loads where the cargo handlers may not be able to see the top of the load.

As noted above, the positioning straps 6, 8 are formed from a webbing material and the deployment straps 12, 14 are formed from a braided material. This helps for identification purposes and enables cargo handlers to quickly and easily distinguish between the two different types of straps. As will be explained in more detail below, the positioning straps 6, 8 are generally pulled before the deployment straps 12, 14, so it is important that cargo handlers are able to distinguish them easily. Forming the straps in this way is only one possible form of identification means, and it will be appreciated that other means are possible with in the scope of the present invention, for example, the straps could be differently coloured to aid identification.

Figure 3:
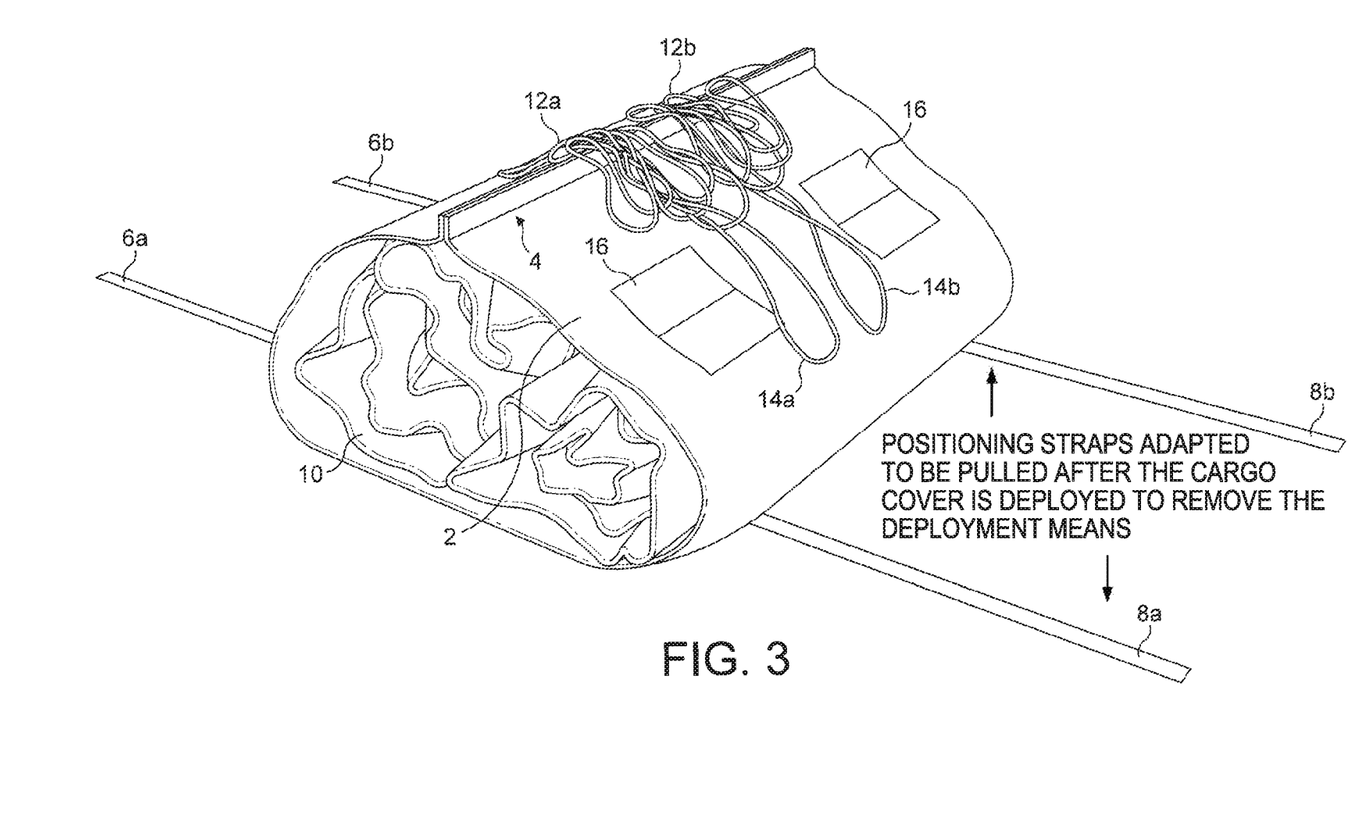
FIG. 3 shows a perspective view of the base sheet of FIG. 1 deployed around the cargo cover.

Once the cargo cover 10 has be folded and loaded on to the base sheet 2, the base sheet 2 is folded around the cargo cover 10 and the two halves of the releasable securement means 4a, 4b are brought together and secured, as can be seen in FIG. 3. Care must be taken when securing the base sheet 2 around the cargo cover 10 to ensure that the deployment straps 12, 14 extend out of the base sheet 2 and are freely accessible. As will be described in more detail below, the deployment straps 12, 14 are used to break open the open the releasable securement means 4 and aid deployment of the cargo cover 10, so they are preferably fed though the join between the two short edges of the base sheet 2.

The outer surface of the base sheet 2 is provided with pockets 16 which can be used for storage of the positioning straps 6, 8 and deployment straps 12, 14 when not in use. This can help to prevent the straps from becoming separated from the base sheet 2.

When the base sheet 2 is folded around the cargo cover 10 it provides protection for the cargo cover, for example from abrasion, dirt, UV deterioration, water damage, vermin, or other contamination. This serves to prolong the life of the cargo cover, as it would limit the wear and tear of the cargo cover 10 during the loading process, during storage and when the kit is in transit, e.g. when the cargo cover is being sent to operators from the manufacturer, or distributed by airlines to hubs, or redistributed after use. The base sheet 2 also serves to keep the cargo cover 10 in a compact form, which aids in handling and saves space in the storage of the cargo cover 10.

Figure 4:
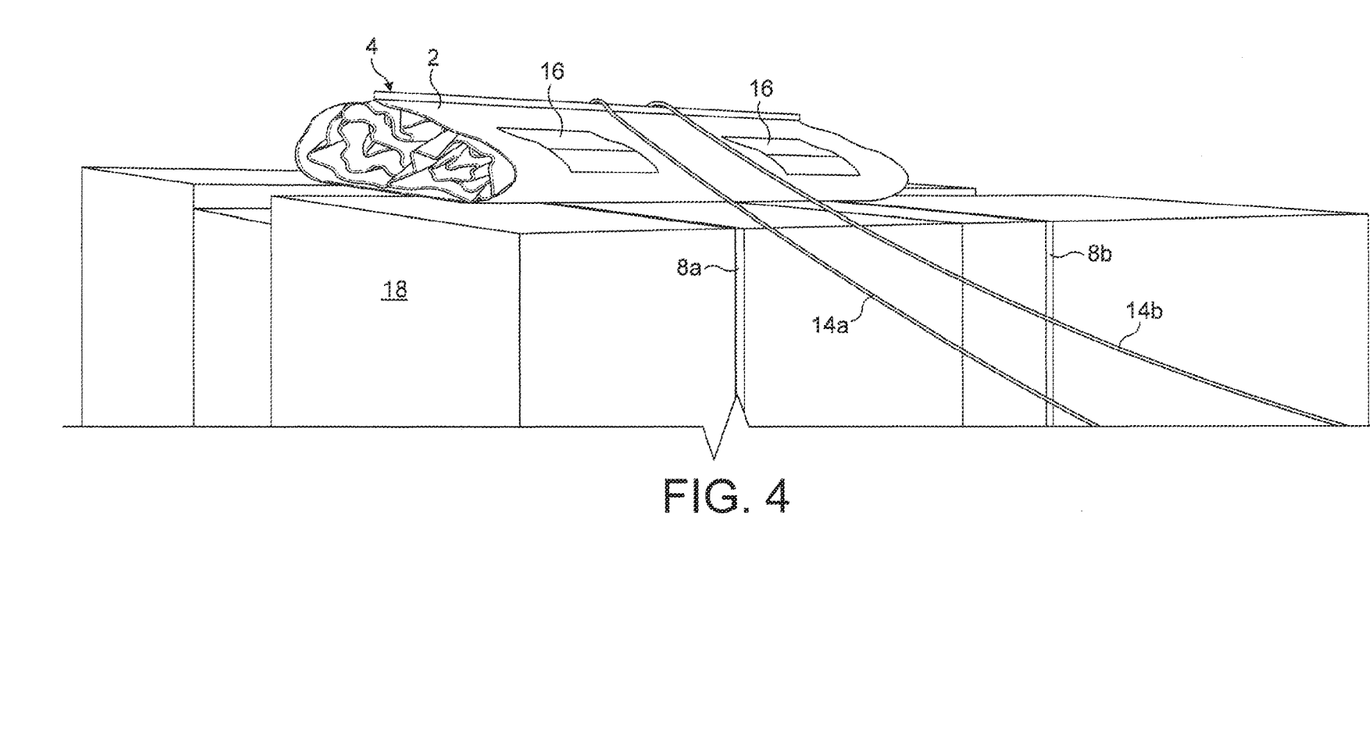
FIG. 4 shows a perspective view of the base sheet and cargo cover on top of a load.

The base sheet 2 containing the cargo cover 10 is then placed on top of a load 18, as shown in FIG. 4. Depending on the size of the load 18, particularly its height, and the combined weight of the base sheet 2 and cargo cover 10, the base sheet 2 and cargo cover 10 can be manually placed on top of the load 18 by cargo handlers or, more commonly, the base sheet 2 and cargo cover 10 will be placed on top of the load 18 using a fork lift truck, or other suitable lifting device.

While the base sheet 2 and cargo cover 10 are being lifted into position it is advisable for at least one cargo handler to take hold of the positioning straps 6, 8 and deployment straps 12, 14. In fact, it is preferable for a cargo handler on one side of the load 18 to hold the positioning straps 6a, 8a and deployment straps 12a, 14a for that side of the load 18 and another cargo handler, located on the opposite side of the load 18, to hold the other positioning straps 6b, 8b and deployment straps 12b, 14b for that side of the load 18. The positioning straps 6, 8 and deployment straps 12, 14 should be long enough to reach across the load 18 and hang down the side such that they can be grasped by a cargo handler standing on the ground.

Once the base sheet 2 and cargo cover 10 have been placed on top of the load 18 the cargo handlers can pull the positioning straps 6, 8 to position the base sheet 2 in the desired position, which will generally be in the centre of the load. The positioning straps 6, 8 are attached to the base sheet 2 only, so they will permit movement of the base sheet 2 without causing the cargo cover 10 to be deployed.

Once the base sheet 2 and cargo cover 10 have been moved to the desired position on top of the load 18 the cargo handlers can pull the deployment straps 12, 14 to deploy the cargo cover 10 over the load 18. Ideally at least two cargo handlers—positioned on opposite sides of the load 18—will pull the deployment straps 12, 14 simultaneously, and it is most preferred for four cargo handlers—located at the four corners of the load 18—to pull the deployment straps 12, 14 simultaneously. When the deployment straps 12, 14 are pulled it exerts a force on the releasable securement means 4, causing the two halves 4a, 4b of said means to pull apart, and release the cargo cover 10 from within the base sheet 2. As noted above, some embodiments may have releasable securement means which must be manually opened prior to use. Such securement means provide additional security and prevent the kit from accidentally opening.

Figure 5:
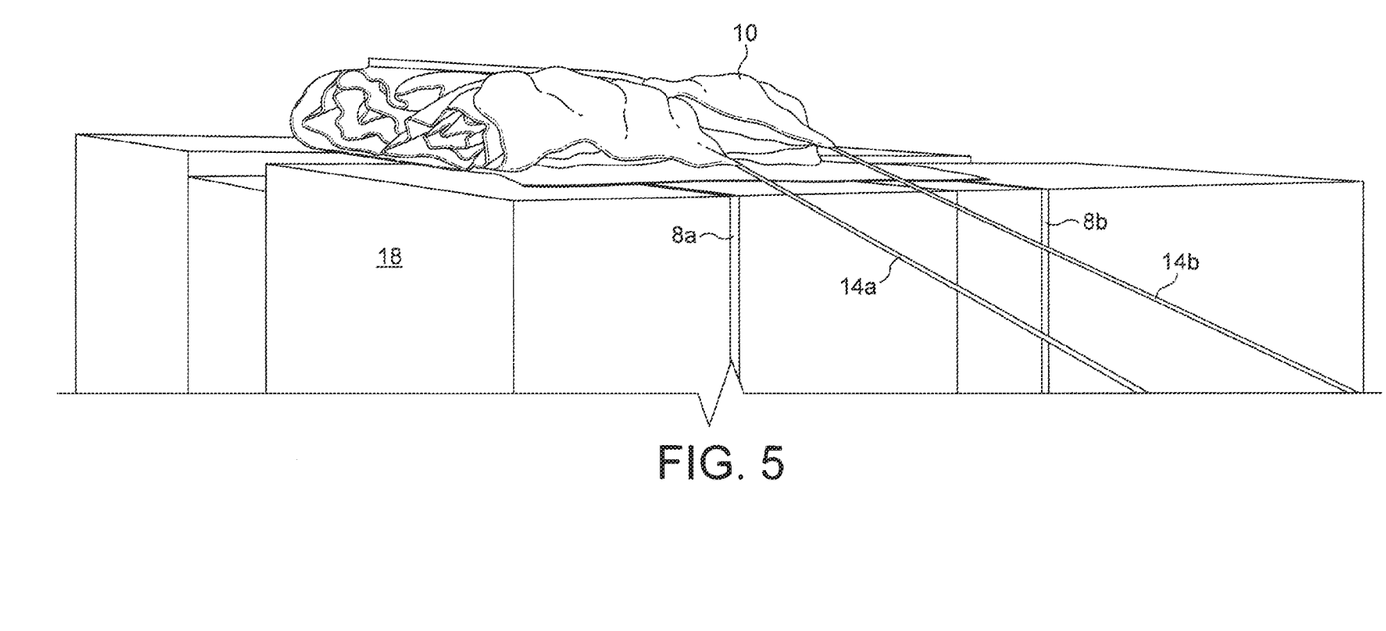
FIG. 5 shows a perspective view of the cargo cover in a partially deployed state.
Figure 6:
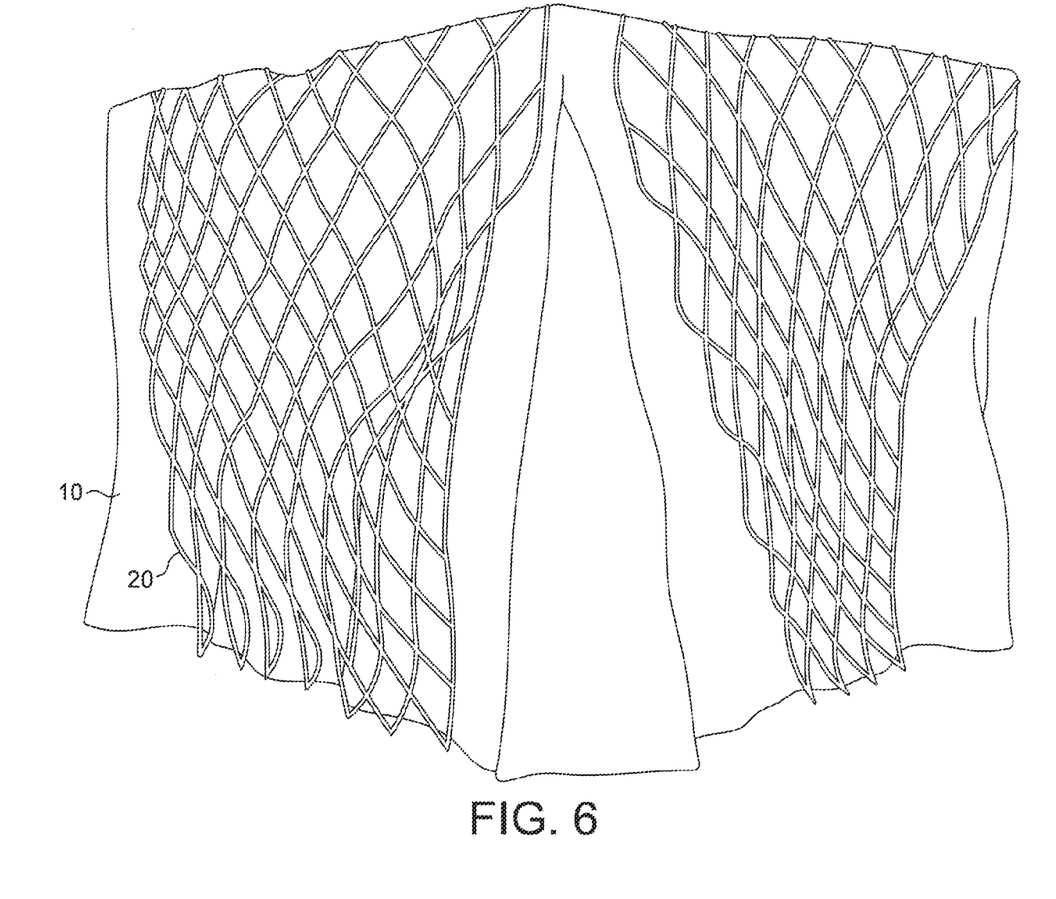
FIG. 6 shows a perspective view of the load with the cargo cover fully deployed.

FIG. 5 shows a perspective view of a cargo cover 10 being deployed over the load 18 in the manner described. The cargo handler(s) continue to pull the deployment straps 12, 14, which causes the cargo cover 10 to unfold from within the base sheet 2 and deploy over the load 18, as can be seen in FIG. 6. Once the cargo cover 10 has been fully deployed over the load 18 it is secured to a pallet in the usual manner. As can be seen in FIG. 6, the cargo cover 10 is provided with an integral cargo net 20. The present invention can be used with cargo covers 10 which are specifically adapted for the purpose, or it can be used with existing cargo covers.

Once the cargo cover 10 has been fully deployed over the load 18 the cargo handlers can pull the positioning straps 6, 8 to remove the base sheet 2 from under the cargo cover 10. Alternatively, the base sheet 2 can be left under the cargo cover 10 for transportation. One advantage of this is that the base sheet 2 will stay with the cargo cover 10 and it can be reused. If the base sheet 2 is removed from under the cargo cover 10 there is a possibility that it will become separated from the cargo cover 10. This may or may not be desired.

The present invention offers significant advantages for cargo handlers in terms of reduced loading time. This is important as a reduction in loading time means quicker turnarounds and an overall reduction in costs. By making the loading process easier for cargo handlers it also reduces the likelihood of cargo covers being inappropriately secured, which is clearly a danger in cargo transportation.

The invention claimed is:

1. A method of covering a palletised cargo load comprising the steps of:

providing a cargo load cover with deployment straps, the cargo cover being adapted to contain fire, the cargo cover being stored in a deployment means, the deployment means comprising a base sheet for containing the cargo load cover, the base sheet comprising releasable securement means for securing the base sheet around the cargo load cover in a closed configuration, and attached positioning straps and being releasably secured around the cargo cover in a closed configuration by the releasable securement means, with the deployment straps extending from the cargo cover in the closed configuration;

placing the cargo cover and deployment means on top of and unfixed to the load in the closed configuration;

positioning the cargo cover and deployment means with respect to the load by pulling on the positioning straps to slide the cargo cover and deployment means with respect to the load; and after the positioning, pulling the deployment straps while the deployment means is in the closed configuration and unfixed to the load to exert force on and open the securement means and release the cargo cover from the deployment means, to deploy the cargo load cover over at least a portion of the cargo load; and after the pulling, securing the cargo cover to the pallet to enclose the cargo load, which remains unfixed to the cargo cover.

2. The method of claim 1, wherein the deployment straps are releasably connectable to the cargo cover, and the method comprises the further step of attaching the deployment straps to the cargo cover.

3. The method of claim 1, wherein the method comprises the step of folding the cargo cover for storage in the deployment means prior to use.

4. The method of claim 1 wherein the deployment straps are connected to the cargo load cover and wherein the step of pulling the deployment straps to open the deployment means and release the cargo cover comprises:

pulling the deployment straps to cause the cargo cover to exert force on the releasable securement components while the deployment means is in the closed configuration to open the deployment means and release the cargo cover from the base sheet.

5. The method of claim 1, wherein the cargo cover is of sufficient size to cover the palletised cargo load with the deployment straps extending from the cargo load cover out of the deployment means in the closed configuration by an amount sufficient to hang along at least a portion of a side of the palletised cargo load and wherein pulling the deployment straps to open the deployment means and release the cargo cover from the deployment means comprises:

pulling on a portion of the deployment straps that hangs along the side of the palletised cargo load to open the deployment means and release the cargo cover from the deployment means and then continuing to pull until the cargo cover is deployed around at least a portion of the side of the cargo load.

6. The method of claim 1, wherein positioning straps are attached to the deployment means and wherein the method further comprises the step of:

pulling on the positioning straps after the cargo cover has been deployed to remove the deployment means.

7. The method of claim 1, wherein at least two opposing deployment straps are provided and wherein pulling the deployment straps to open the securement means and release the cargo cover from the deployment means comprises:

pulling on a first of the opposing deployment straps from a first direction while also pulling on a second of the opposing deployment straps from an opposite direction to open the securement means and release the cargo cover from the deployment means and deploy first and second portions of the cargo cover in opposing directions.

8. A method of covering a palletised cargo load comprising the steps of:

providing a cargo load cover with deployment straps, the cargo cover being adapted to contain fire, the cargo cover being stored in a base sheet, the base sheet having releasable securement components and attached positioning straps and being releasably secured around the cargo cover in a closed configuration by the releasable securement components, with the deployment straps extending out of the base sheet in the closed configuration;

placing the base sheet with the cargo cover stored inside on top of and unfixed to the cargo load in the closed configuration;

positioning the cargo cover and deployment straps with respect to the load by pulling on the positioning straps to slide the base sheet with the cargo cover stored inside with respect to the load;

after the positioning, pulling the deployment straps to open the base sheet and release the cargo cover from the base sheet while the cargo cover and base sheet remain unfixed to the load;

continuing to pull the deployment straps after releasing the cargo cover to deploy the cargo cover over the load, and after the pulling, securing the cargo cover to the pallet to enclose the cargo load, which remains unfixed to the cargo cover.

9. The method of claim 8, wherein the deployment straps are releasably connectable to the cargo cover, and the method comprises the further step of attaching the deployment straps to the cargo cover.

10. The method of claim 8, wherein the method comprises the step of folding the cargo cover for storage in the base sheet prior to use.

11. The method of claim 8 wherein the deployment straps are connected to the cargo load and wherein pulling the deployment straps to open the base sheet and release the cargo cover comprises:

pulling the deployment straps to cause the cargo cover to exert force on the releasable securement components while the base sheet is in the closed configuration to open the base sheet and release the cargo cover from the base sheet.

12. The method of claim 8, wherein the cargo cover is of sufficient size to cover the palletised cargo load with the deployment straps extending from the cargo load cover out of the base sheet in the closed configuration by an amount sufficient to hang along at least a portion of a side of the palletised cargo load and wherein pulling the deployment straps to open the base sheet and release the cargo cover from the base sheet comprises:

pulling on a portion of the deployment straps that hangs along the side of the palletised cargo load to open the base sheet and release the cargo cover from the base sheet and then continuing to pull until the cargo cover is deployed around at least a portion of the side of the cargo load.

13. The method of claim 8, wherein positioning straps are attached to the base sheet and wherein the method further comprises the step of:
pulling on the positioning straps after the cargo cover has been deployed to remove the base sheet.

14. The method of claim 8, wherein at least two opposing deployment straps are provided and wherein pulling the deployment straps to open the base sheet and release the cargo cover from the base sheet comprises:
pulling on a first of the opposing deployment straps from a first direction while also pulling on a second of the opposing deployment straps from an opposite direction to open the base sheet and release the cargo cover from the base sheet and deploy first and second portions of the cargo cover in opposing directions.

15. A method of covering a palletised cargo load comprising the steps of:
providing a cargo load cover with deployment straps, the cargo cover being adapted to contain fire;
placing the cargo cover within a closable base sheet having releasable securement components and attached positioning straps;
closing the base sheet around the cargo cover and securing the base sheet in a closed configuration around the cargo cover using the securement components, with the deployment straps of the cargo cover extending out of the base sheet in the closed configuration;
positioning the closed base sheet, with the cargo cover inside, atop and unfixed to the cargo load using the positioning straps to slide the base sheet with the cargo cover stored inside with respect to the load;
after the positioning, pulling the deployment straps to cause the cargo cover to exert force on the releasable securement components to open the base sheet and release the cargo cover from the base sheet while the cargo cover and base sheet remain unfixed to the load;
further pulling on the deployment straps to deploy the cargo cover over at least a portion of the cargo load; and
after the pulling, securing the cargo cover to the pallet to enclose the cargo load, which remains unfixed to the cargo cover.

16. The method of claim 15, wherein at least two opposing deployment straps are provided and wherein pulling the deployment straps to cause the cargo cover to exert force on the releasable securement components to open the base sheet and release the cargo cover from the base sheet comprises:
pulling on a first of the opposing deployment straps from a first direction while also pulling on a second of the opposing deployment straps from an opposite direction to open the base sheet and release the cargo cover from the base sheet and deploy first and second portions of the cargo cover in opposing directions.

17. The method of claim 15, wherein the method further comprises the step of:
pulling on the positioning straps after the cargo cover has been deployed to remove the base sheet.

18. The method of claim 15, wherein the cargo cover is of sufficient size to cover a palletised cargo load with the deployment straps extending from the cargo load cover out of the base sheet in the closed configuration by an amount sufficient to hang along at least a portion of a side of the palletised cargo load and wherein pulling the deployment straps to open the base sheet and release the cargo cover from the base sheet comprises:
pulling on a portion of the deployment straps that hangs along the side of the palletised cargo load to open the base sheet and release the cargo cover from the base sheet and then continuing to pull until the cargo cover is deployed around at least a portion of the side of the cargo load.

* * * * *